(12) United States Patent
Dahiya et al.

(10) Patent No.: US 12,443,527 B1
(45) Date of Patent: Oct. 14, 2025

(54) CACHING STRATEGY BASED ON MODEL EXECUTION TIME, FREQUENCY AND INPUT ORDER WITH CONFIGURABLE PRIORITY

(71) Applicant: Oracle International Corporation, Redwood Shores, CA (US)

(72) Inventors: Aneesh Dahiya, Zurich (CH); Renata Khasanova, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/632,946

(22) Filed: Apr. 11, 2024

(51) Int. Cl.
*G06F 12/0802* (2016.01)
*G06F 12/123* (2016.01)

(52) U.S. Cl.
CPC ........ *G06F 12/0802* (2013.01); *G06F 12/123* (2013.01); *G06F 2212/60* (2013.01)

(58) Field of Classification Search
CPC . G06F 12/0802; G06F 12/123; G06F 2212/60
See application file for complete search history.

(56) References Cited

U.S. PATENT DOCUMENTS

| | | | | |
|---|---|---|---|---|
| 6,266,742 B1 * | 7/2001 | Challenger | ......... | G06F 12/0888 711/143 |
| 6,754,662 B1 * | 6/2004 | Li | ....................... | G06F 16/9014 707/693 |
| 9,773,026 B1 * | 9/2017 | Tetreault | ............. | G06F 11/3034 |
| 10,685,295 B1 | 6/2020 | Ross | | |
| 12,045,698 B1 * | 7/2024 | May | .......................... | G06F 8/35 |
| 2003/0225974 A1 * | 12/2003 | Bopardikar | ........... | G06F 12/121 711/E12.07 |
| 2010/0332436 A1 | 12/2010 | Yanagisawa | | |
| 2012/0042126 A1 | 2/2012 | Krick | | |
| 2012/0051537 A1 | 3/2012 | Chishti | | |
| 2015/0067088 A1 | 3/2015 | Guerin | | |
| 2015/0095581 A1 * | 4/2015 | Stairs | ..................... | G06F 12/084 711/136 |
| 2016/0077926 A1 | 3/2016 | Mutalik | | |
| 2016/0246733 A1 * | 8/2016 | Condict | .............. | H04L 67/1097 |
| 2017/0315932 A1 * | 11/2017 | Moyer | .................... | G06F 12/123 |

(Continued)

OTHER PUBLICATIONS

Dahiya, U.S. Appl. No. 18/403,946, filed Jan. 4, 2024, Pre-Brief Appeal Conference decision, Mailing Date Jun. 13, 2025.

(Continued)

*Primary Examiner* — Michael Krofcheck
(74) *Attorney, Agent, or Firm* — Hickman Becker Bingham Ledesma LLP (57) ABSTRACT

A computer-implemented method includes receiving an input for a deterministic model, and determining whether the input and an output from the model corresponding to the input are stored in a cache. The method further includes, in accordance with the input and the output not being stored in the cache, computing the output from the model based on the input, storing the input and the output as a cache element, and storing raw scores respectively indicating a usage frequency and order of usage of the element, and a computation time for computing the output. The method further includes calculating a caching score for the element; the caching score includes a sum of a normalized scores each corresponding to a product of a raw score and a scaling factor.

20 Claims, 5 Drawing Sheets

(56) References Cited

U.S. PATENT DOCUMENTS

| | | |
|---|---|---|
| 2019/0303480 A1 | 10/2019 | Canis |
| 2021/0073808 A1* | 3/2021 | Gu |
| 2022/0051088 A1* | 2/2022 | Meng .................... G06F 9/5027 |
| 2023/0079746 A1* | 3/2023 | Chen ................... G06F 12/0868 |
| | | 711/118 |

OTHER PUBLICATIONS

Dahiya, U.S. Appl. No. 18/403,946, filed Jan. 4, 2024, Notice of Allowance and Fees Due, Mailing Date Jul. 29, 2025.
Dahiya, U.S. Appl. No. 18/403,946, filed Jan. 4, 2024, Notice of Allowance and Fees Due, Mailing Date Jul. 1, 2025.
Dahiya, U.S. Appl. No. 18/403,946, filed Jan. 4, 2024, Non-Final Rejection, Mailing Date Feb. 24, 2025.
Dahiya, U.S. Appl. No. 18/403,946, filed Jan. 4, 2024, Final Rejection, Mailing Date May 9, 2025.
Sanders et al., "A Baysian Approach for the Robust Optimisation of Expensive-To-Evaluate Functions" IEEE Transactions On Evolutionary Computation, May 9, 2019 (11 pages).
O'Neil et al., "The LRU-K Page Replacement Algorithm for Database Disk Buffering", SIGMOD Rec., Jun. 1993,vol. 22, No. 2, p. 297-306.
Cormen et al., "Intorduction to Algorithms", The MIT Press, Massachusetts Institute of Technology, 2022, pp. 161-182.
Bojanowski et al., "EnrichingWord Vectors with Subword Information", arXiv:1607.04606v2 [cs.CL], Jun. 19, 2017, 12 pages.

* cited by examiner

CACHING STRATEGY BASED ON MODEL EXECUTION TIME, FREQUENCY AND INPUT ORDER WITH CONFIGURABLE PRIORITY

FIELD OF THE INVENTION

The present invention relates to computing with large datasets, and more particularly to a caching scheme based on model execution time, approximate frequency and input order with configurable priority.

BACKGROUND

Many applications use large data collections, which often consist of repetitive samples. For example, machine generated database logs, social networks, web search or medical reports often contain a large proportion of duplicated content; it is not known in advance which samples are duplicated. Running an algorithm on such duplicated samples results in unnecessary calculations. One way to improve computational time for a dataset with repetitive samples is to use caches. Cache is an auxiliary memory which allows high-speed retrieval.

A Least Recently Used (LRU) caching algorithm is commonly used. In LRU caching, elements are added to the cache until cache capacity is reached. When that happens, the least recently used sample is replaced with the new incoming sample. Least Frequently Used (LFU) is another caching strategy. LFU is similar to LRU, with the differentiating factor being frequency of input of an element. In LFU, the least frequent element is replaced by a new incoming element. However, in situations where inference execution time varies widely among different samples, LRU and LFU lead to cache behavior that is not optimal, since LRU and LFU can focus attention on elements that are easy to recalculate instead of elements that require greater amounts of computational power.

Another caching strategy focuses on execution time (that is, the time required to generate an output from a given new input). This strategy can also lead to suboptimal performance for some workloads where frequency and order of the inputs play an important role. It therefore is desirable to base a caching strategy on execution time, frequency and order of a given sample, and configure different priorities for these factors based on the workload.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In accordance with aspects of the disclosure, a strategy to cache a data element (the input i and output o of a deterministic model) is based on the computation time required to generate output o from the model, the order in which the element is called in the cache, and a frequency of appearance of the element. A deterministic model generates the same output o for a given input i; for example, deterministic machine learning (ML) model inference, extracting information from database, etc. This results in improved execution time for deterministic models, when the model encounters the same inputs over a period of time (as is usual in numerous applications). When an input i is first encountered, the computed output o from the model is saved in the cache; in various embodiments, the cache is represented by a hashmap, where the key is input i and the value is output o. When the same input is encountered again, the output is fetched from the cache instead of recomputing. This saves computational resources, particularly when the underlying model is large.

In various embodiments, a caching score $s_c$ is calculated for each input element i. This score is calculated based on execution time, the order in which elements appeared or were called in the cache, and a frequency of appearance of the element:

$$s_c = \alpha s_t + \beta s_r + \gamma s_f$$

where $s_t$, $s_r$, and $s_f$ are normalized scores for the execution time, order and frequency, and $\alpha$, $\beta$, $\gamma$ are scaling weights for the corresponding normalized scores.

The normalized scores are calculated by min-max normalization of raw values of the corresponding scores. This is done to bring the score values into the range [0, 1]. In various embodiments, a normalization procedure is done each time the cache is updated. The time required for the normalization procedure is generally O(N), where N is the size of the cache; N is assumed to be much smaller than the size of the dataset M: N<<M.

The raw scores are calculated as follows:

$s_t^{raw}$ is the execution time in seconds required for the model to produce an output for a given input;

$s_r^{raw}$ represents the order of usage of an element in the cache. In an embodiment, a processing system maintains a counter for the number of inputs obtained by the cache in a recent period of time. The $s_r^{raw}$ of a new element added to (or an existing element requested from) the cache is assigned the most recent value of this counter;

$s_f^{raw}$ is the usage frequency of an element in the cache. In an embodiment, the usage frequency of a new element added to the cache is zero; each time a given element is requested from the cache, $s_r^{raw}$ is incremented by 1 for that element.

In various embodiments, a processing system determines whether an incoming element i is already in the cache; this operation can be performed in O(1) time. If element i is in the cache, the processing system returns the output o that is saved in the cache, and updates the $s_r^{raw}$ and $s_f^{raw}$. If element i is not in the cache, the element in the cache having the lowest score $s_c$ is removed from the cache, and the new element i is added. These operations are described in more detail with reference to FIGS. 1-3.

2. Adding Elements to the Cache

Figure 1:
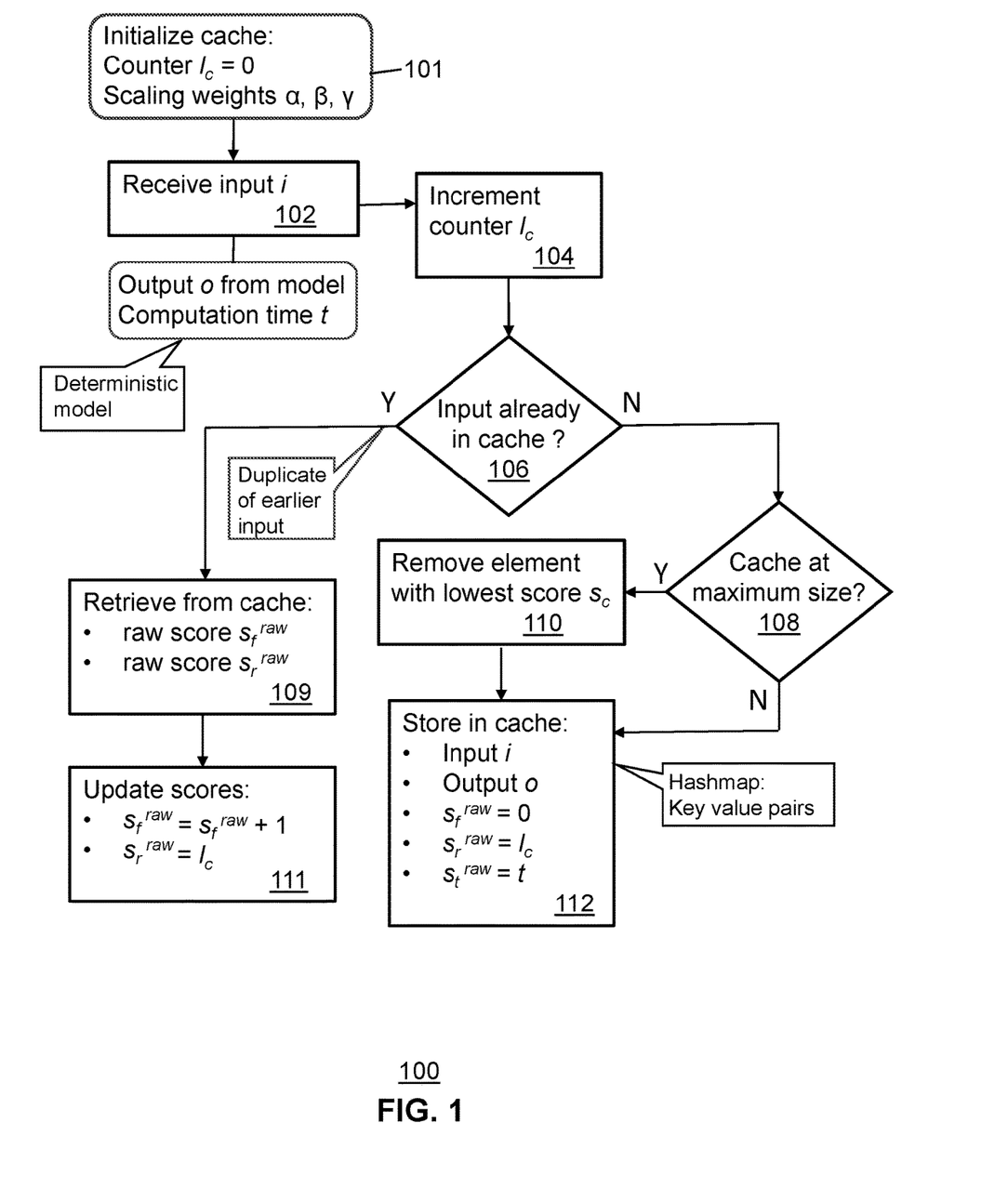
FIG. 1 is a flowchart depicting a procedure for adding elements (inputs and outputs of a model) using a caching strategy that takes into account all three factors of execution time, frequency and order, in accordance with embodiments of the disclosure.

FIG. 1 is a flowchart depicting a procedure 100 for adding elements to a cache of limited size in accordance with embodiments of the disclosure. In various embodiments, a hashmap stores inputs with raw scores and outputs ($s_t^{raw}$, $s_r^{raw}$, $s_f^{raw}$, o) as key value pairs; the cache has a maximum size K.

The cache is initialized 101 in a procedure that includes setting a counter $l_c$ to 0 and setting values for the scaling weights α, β, γ. A processing system receives an input i for a deterministic model (step 102) and increments counter $l_c$ (step 104); in this embodiment, the output o has been computed from the model, based on the input i with computation time t, for storage in the cache along with input i.

The system then determines (step 106) whether the input is already stored in the cache. If so, the new input is a duplicate of an earlier input, and the corresponding output o is also already stored in the cache. The raw scores $s_r^{raw}$, $s_f^{raw}$ are retrieved from the cache (step 109) and then updated (step 111); $s_r^{raw}$ is incremented by 1, and $s_f^{raw}$ is assigned the current value of the counter $l_c$.

If the input is not stored in the cache (for example, the input i is encountered for the first time), the processing system determines whether the cache is at the maximum size K (step 108). If the cache is at the maximum size K (step 108), the cache element with the lowest score $s_c$ is removed from the cache (step 110). The input i and output o are added to the hashmap (step 112), and the raw scores for the new element are added to the cache: $s_f^{raw}=0$, $s_r^{raw}=1_c$, $s_t^{raw}=1$.

3. Prediction from a Model Using a Cache

Figure 2:
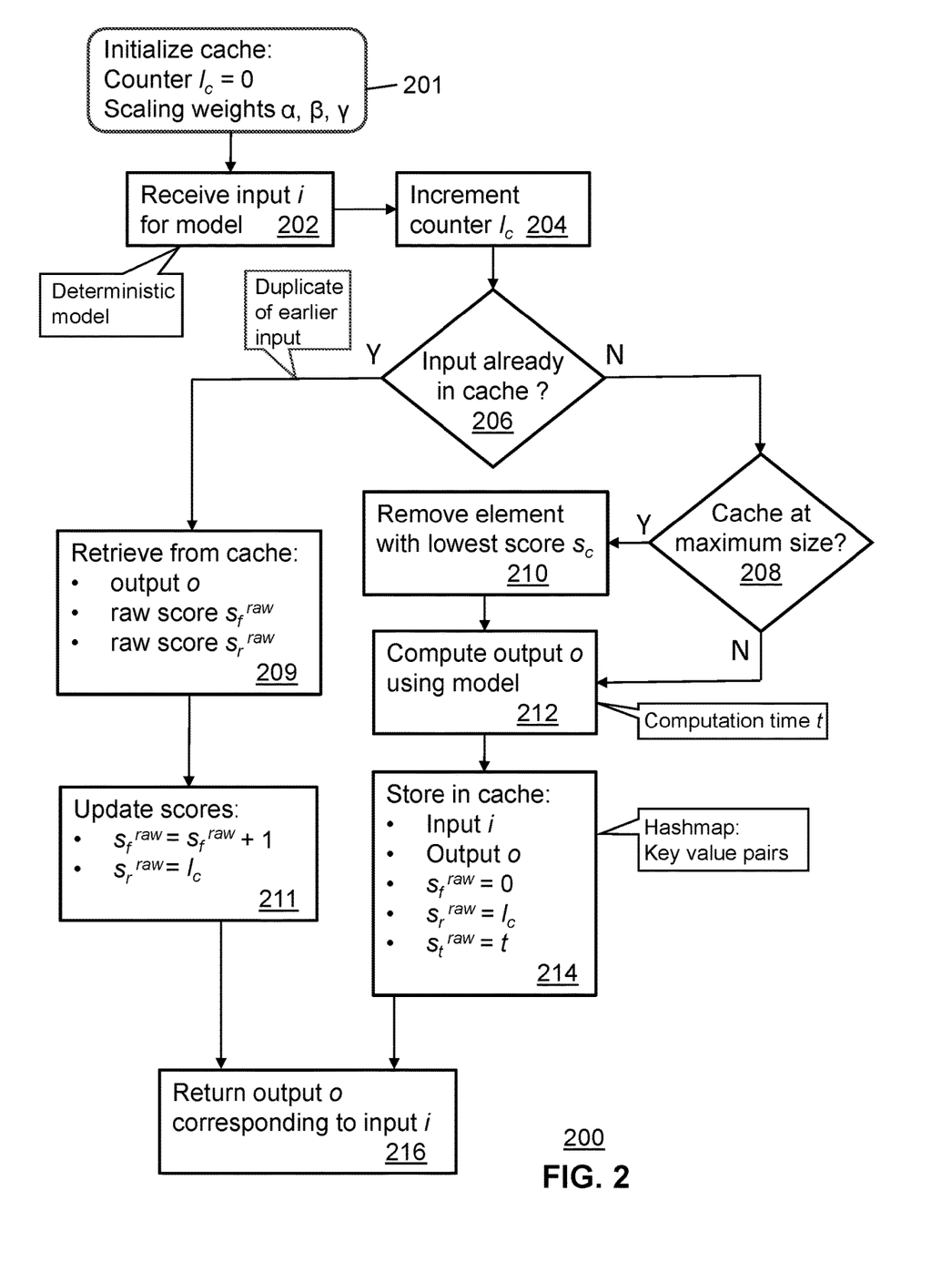
FIG. 2 is a flowchart depicting a procedure for computing and caching outputs of a model using a caching strategy that takes into account all three factors of execution time, frequency and order, in accordance with additional embodiments of the disclosure.

FIG. 2 is a flowchart depicting a procedure 200 for caching input and output of a model, in accordance with embodiments of the disclosure. The cache is initialized 201 in a procedure that includes setting a counter $l_c$ to 0 and setting values for the scaling weights α, β, γ. A processing system receives an input i for a deterministic model (step 202) and increments counter $l_c$ (step 204).

The system then determines (step 206) whether the input is already stored in the cache. If so, the new input is a duplicate of an earlier input, and the corresponding output o is also already stored in the cache. The output o is retrieved from the cache; the raw scores $s_r^{raw}$, $s_f^{raw}$ are also retrieved from the cache (step 209) and then updated (step 211); $s_r^{raw}$ is incremented by 1, and $s_f^{raw}$ is assigned the current value of the counter $l_c$. The system then returns the output o corresponding to the input i (step 216).

If the input is not stored in the cache (for example, the input i is encountered for the first time), the processing system determines whether the cache is at the maximum size K (step 208). If the cache is at the maximum size K (step 208), the cache element with the lowest score $s_c$ is removed from the cache (step 210). The output o is then computed from the input i using the model (step 212). In step 214, the input i, the output o and the raw scores for the new element are added to the cache: $s_f^{raw}=0$, $s_r^{raw}=1_c$, $s_t^{raw}=1$. The system then returns the output o corresponding to the input i (step 216).

4. Removing an Element from a Cache

Figure 3:
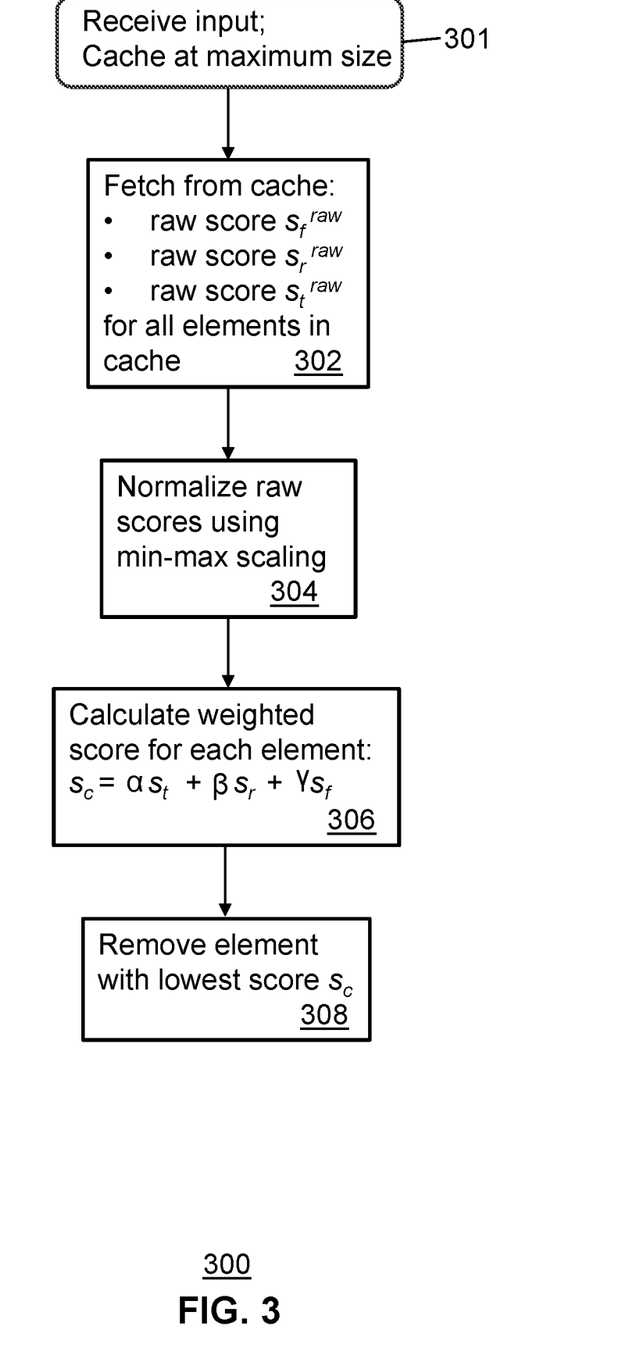
FIG. 3 is a flowchart depicting a procedure for removing elements from a cache based on a total weighted score involving execution time, frequency and order, in accordance with further embodiments of the disclosure.

FIG. 3 is a flowchart depicting a procedure 300 for removing elements from a cache, in accordance with embodiments of the disclosure. In step 301, an input i is received when the cache is at its maximum size. The raw scores $s_f^{raw}$, $s_r^{raw}$, $s_t^{raw}$ are fetched from the cache for all elements in the cache (step 302). The raw scores are then normalized using a min-max scaling procedure (step 304). A weighted score $s_c$ is calculated (step 306) for each element in the cache: $s_c=\alpha s_t+\beta s_r+\gamma s_f$. The element with the lowest score is then removed from the cache (step 308).

5. Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
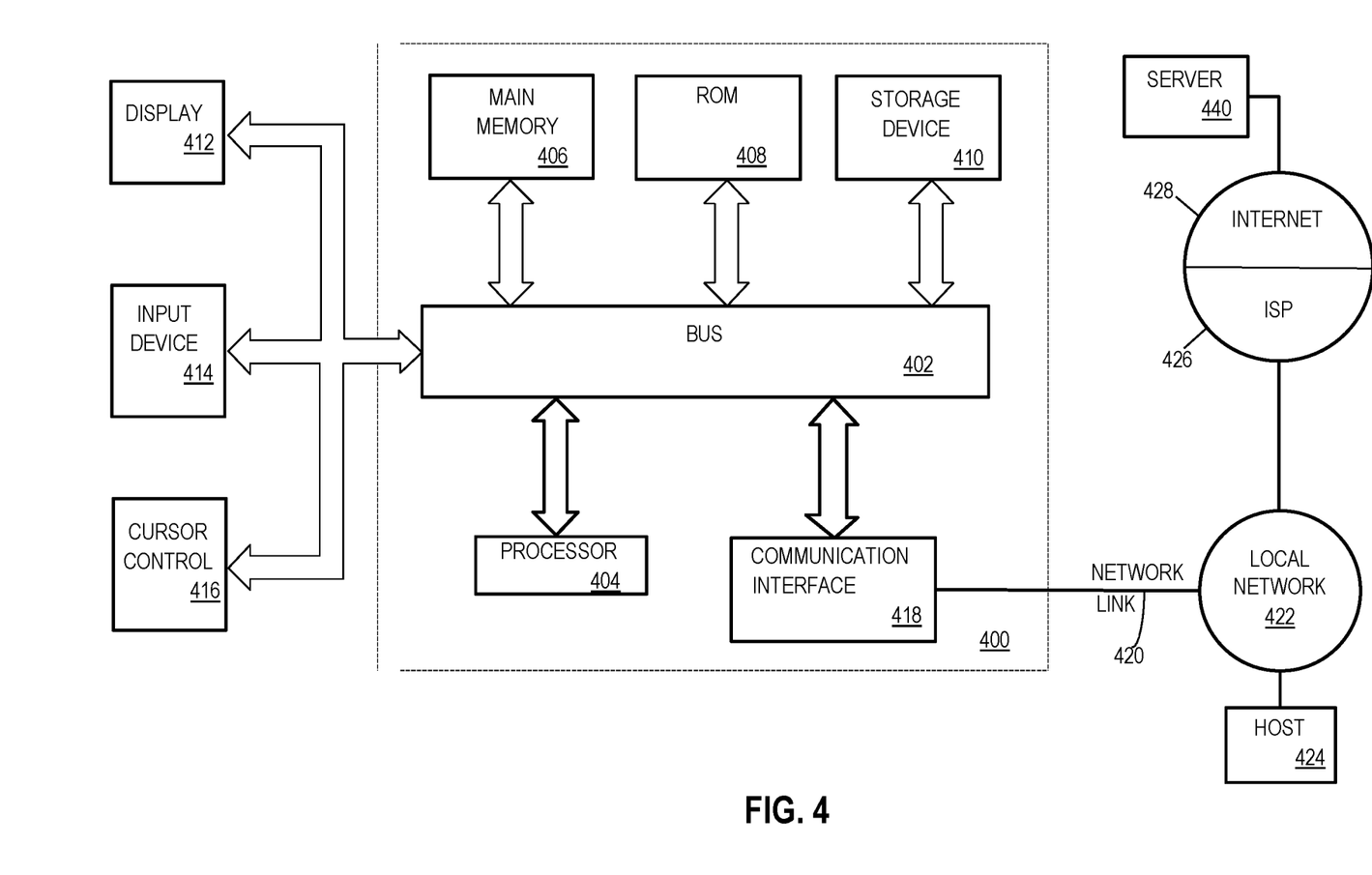
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

6. Software Overview

Figure 5:
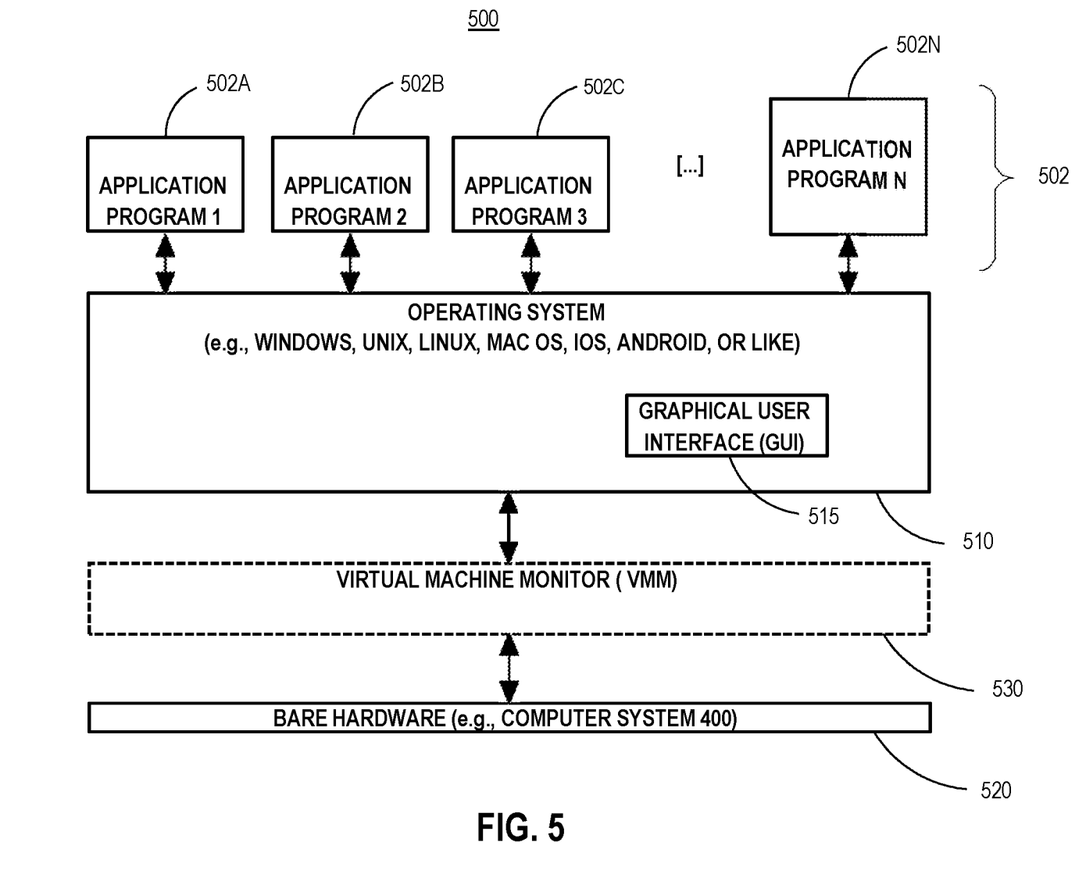
FIG. 5 is a block diagram of a basic software system that may be employed for controlling the operation of a computer system upon which an embodiment of the invention may be implemented.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

7. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving an input for a deterministic model;
   determining whether the input and an output from the model corresponding to the input are stored in a cache;
   in accordance with the input and the output not being stored in the cache:
      computing the output from the model based on the input,
      storing the input and the output in the cache as an element of the cache, and
      storing a first raw score indicating a usage frequency of the element, a second raw score indicating an order of usage of the element, and a third raw score indicating a computation time for computing the output based on the input;
   in accordance with the input and the output being stored in the cache, updating the first raw score and the second raw score; and
   calculating a caching score associated with the element, wherein the caching score comprises a sum of a first normalized score corresponding to a product of the first raw score and a first scaling factor, a second normalized score corresponding to a product of the second raw score and a second scaling factor, and a third normalized score corresponding to a product of the third raw score and a third scaling factor.

2. The computer-implemented method according to claim 1, wherein the cache comprises a plurality of elements each comprising an input-output pair, wherein each input-output pair in the plurality of elements is stored in a hashmap.

3. The computer-implemented method according to claim 2, wherein each input-output pair comprises a key value pair stored in the hashmap.

4. The computer-implemented method according to claim 1, further comprising determining whether the cache is at a maximum size.

5. The computer-implemented method according to claim 4, further comprising:
in accordance with the cache being at the maximum size, removing from the cache the element having the lowest caching score.

6. The computer-implemented method according to claim 1, wherein the first normalized score, the second normalized score and the third normalized score are calculated in a min-max normalization procedure.

7. The computer-implemented method according to claim 1, further comprising a cache initialization procedure including setting the first scaling factor, the second scaling factor and the third scaling factor.

8. The computer-implemented method according to claim 7, wherein the initialization procedure comprises initializing a counter $l_c$ at $l_c=0$, wherein the receiving comprises incrementing the counter $l_c$, and wherein the updating comprises incrementing the first raw score and setting the second raw score to a current value of the counter $l_c$.

9. A non-transitory computer-readable medium comprising instructions executable by a processor to:
receive an input for a deterministic model;
determine whether the input and an output from the model corresponding to the input are stored in a cache;
in accordance with the input and the output not being stored in the cache:
compute the output from the model based on the input,
store the input and the output in the cache as an element of the cache, and
store in the cache a first raw score indicating a usage frequency of the element, a second raw score indicating an order of usage of the element, and a third raw score indicating a computation time for computing the output based on the input;
in accordance with the input and the output being stored in the cache, update the first raw score and the second raw score; and
calculate a caching score associated with the element, wherein the caching score comprises a sum of a first normalized score corresponding to a product of the first raw score and a first scaling factor, a second normalized score corresponding to a product of the second raw score and a second scaling factor, and a third normalized score corresponding to a product of the third raw score and a third scaling factor.

10. The non-transitory computer-readable medium of claim 9, wherein the cache comprises a plurality of elements each comprising an input-output pair, wherein each input-output pair in the plurality of elements is stored in a hashmap.

11. The non-transitory computer-readable medium of claim 10, wherein each input-output pair comprises a key value pair stored in the hashmap.

12. The non-transitory computer-readable medium of claim 9, further comprising instructions to determine whether the cache is at a maximum size, and in accordance with the cache being at the maximum size, remove from the cache the element having the lowest caching score.

13. The non-transitory computer-readable medium of claim 9, wherein the first normalized score, the second normalized score and the third normalized score are calculated in a min-max normalization procedure.

14. The non-transitory computer-readable medium of claim 9, further comprising instructions to perform a cache initialization procedure including setting the first scaling factor, the second scaling factor and the third scaling factor.

15. A system comprising:
a processor; and
a memory that stores executable instructions that, when executed by the processor, facilitate performance of operations, the operations comprising:
receiving an input for a deterministic model;
determining whether the input and an output from the model corresponding to the input are stored in a cache;
in accordance with the input and the output not being stored in the cache:
computing the output from the model based on the input,
storing the input and the output in the cache as an element of the cache, and
storing in the cache a first raw score indicating a usage frequency of the element, a second raw score indicating an order of usage of the element, and a third raw score indicating a computation time for computing the output based on the input;
in accordance with the input and the output being stored in the cache, updating the first raw score and the second raw score; and
calculating a caching score associated with the element, wherein the caching score comprises a sum of a first normalized score corresponding to a product of the first raw score and a first scaling factor, a second normalized score corresponding to a product of the second raw score and a second scaling factor, and a third normalized score corresponding to a product of the third raw score and a third scaling factor.

16. The system of claim 15, wherein the cache comprises a plurality of elements each comprising an input-output pair, wherein each input-output pair in the plurality of elements is stored in a hashmap.

17. The system of claim 16, wherein each input-output pair comprises a key value pair stored in the hashmap.

18. The system of claim 15, wherein the operations further comprise determining whether the cache is at a maximum size, and in accordance with the cache being at the maximum size, removing from the cache the element having the lowest caching score.

19. The system of claim 15, wherein the first normalized score, the second normalized score and the third normalized score are calculated in a min-max normalization procedure.

20. The system of claim 15, wherein the operations further comprise performing a cache initialization procedure including setting the first scaling factor, the second scaling factor and the third scaling factor.

* * * * *